No. 861,771. PATENTED JULY 30, 1907.
F. SCHULZE.
POTATO DIGGING MACHINE.
APPLICATION FILED MAR. 13, 1907.
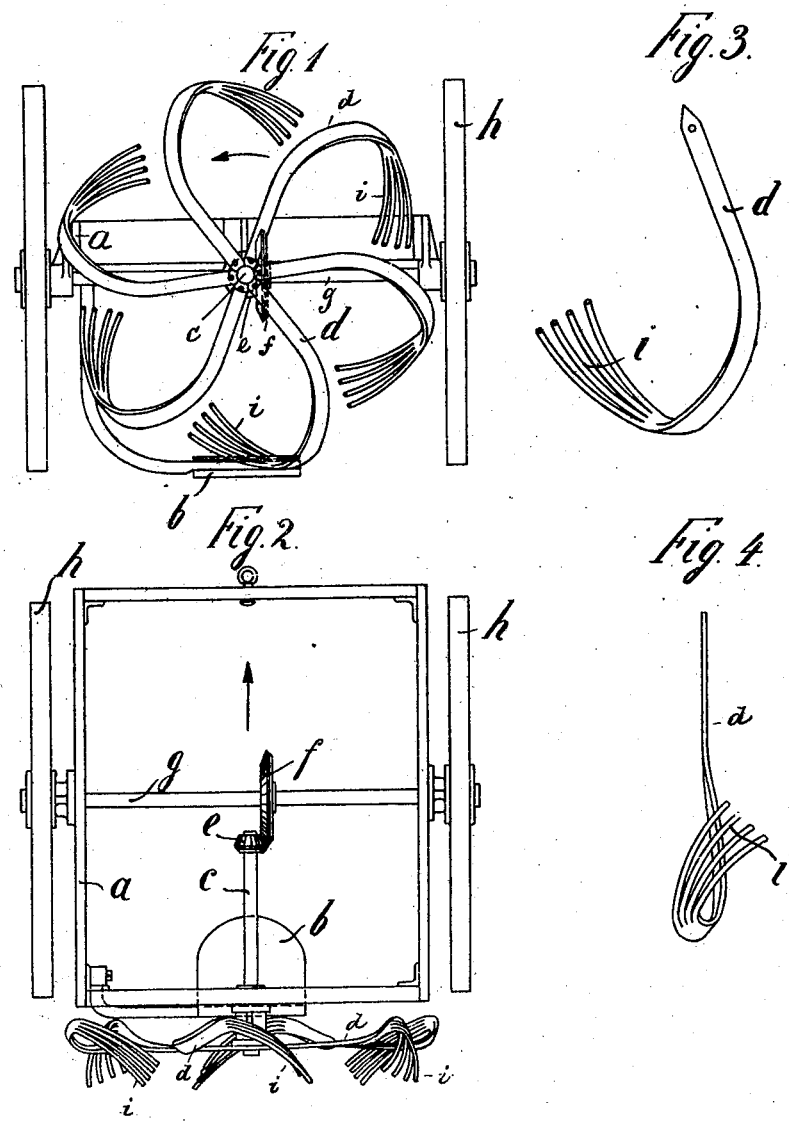

UNITED STATES PATENT OFFICE.

FRIEDRICH SCHULZE, OF HANOVER, GERMANY.

POTATO-DIGGING MACHINE.

No. 861,771.　　　　Specification of Letters Patent.　　　　Patented July 30, 1907.

Application filed March 13, 1907. Serial No. 362,092.

*To all whom it may concern:*

Be it known that I, FRIEDRICH SCHULZE, a subject of German Emperor, and residing at Hanover, Germany, have invented new and useful Improvements in or Relating to Potato-Digging Machines and the Like, of which the following is a specification.

This invention relates to improvements in potato digging machines in which the potatoes together with the earth adhering to them are uprooted by means of a plow share and thrown backwards by means of a wheel arranged behind the plow share being thus partially freed from the earth. The arms of the throwing wheel have been bent back in an oblique and helical manner so that the potatoes are thrown off by the arms of the wheel laterally and backwards without damage.

According to this invention it is intended to free the potatoes in a complete manner from the earth adhering to them when they are still on the wheel arms, and for this purpose the ends of the said throwing arms are formed according to this invention in to the shape of a grid the width of the openings in the grid gradually increasing towards the end of the arms. The grid extends from a point near where the helical twist begins to the end of the arm and the grid itself is helically twisted. As the potatoes have to slide down along the comparatively long bars of the grid, they are freed from the earth which falls through the openings of the grid so that the work done by the throwing arms is facilitated by the reduction in the weight of the potatoes owing to their being freed from the earth adhering to them.

A construction according to this invention is illustrated by way of example in the accompanying drawing.

Figure 1 shows a rear elevation of the digging machine, Fig. 2 is a plan, and Figs. 3 and 4 show a throwing arm in side and front elevation respectively.

Behind the share $b$ mounted on the machine frame $a$ the throwing arms $d$ secured to the spindle $c$ rotate at a great speed in the direction of the arrow (Fig. 1). They are driven by means of toothed wheels $e$ and $f$ and by the axle $g$ of the road wheels $h$. The ends of the throwing arms or throwing spades $d$ are bent in a helical manner and their ends are in the form of a grid $i$ comprising a number of bars, the distance between which increases towards the end of the arm. The potatoes or the like together with the earth, discharged by the share $b$, come to the arms $d$ which throw them off laterally and backwards, the grids $i$ acting in the manner described to free the potatoes from the earth adhering to them.

What I claim is:—

1. A potato digging machine having a throwing wheel provided with helically twisted arms which rotate at right angles to the direction of motion of the machine characterized by the end of the throwing arms being formed into a helically twisted grid $i$ the openings between the bars of which gradually increase towards the end of the arms substantially as and for the purpose described.

2. A potato harvester comprising a carriage, a plow share secured thereto, and a rear throwing-wheel having helically bent arms that terminate in diverging fingers, substantially as specified.

Signed by me at Hanover, Germany, U. S. consulate this 25th day of Feby. 1907.

FRIEDRICH SCHULZE.

Witnesses:
　PAUL R. THOMPSON,
　JAMES M. BOWCOCK.